US005142297A

United States Patent [19]

Eijkman et al.

[11] Patent Number: 5,142,297

[45] Date of Patent: Aug. 25, 1992

[54] NOZZLE CONFIGURATION FOR AN INK-JET PRINTER AND PROCESS FOR OPERATING SUCH A NOZZLE CONFIGURATION

[75] Inventors: Paulus F. W. Eijkman, Eindhoven; Wilhelmus J. C. Prinsen, Winssen; Jacobus H. Diederen, Cuijk, all of Netherlands

[73] Assignee: Stork X-Cel B.V., Netherlands

[21] Appl. No.: 499,175

[22] Filed: Mar. 26, 1990

[30] Foreign Application Priority Data

Mar. 28, 1989 [NL] Netherlands ........................ 8900760

[51] Int. Cl.[5] ............................................ G01D 15/18

[52] U.S. Cl. ....................................... 346/1.1; 346/75

[58] Field of Search .................................. 346/1.1, 75

[56] References Cited

U.S. PATENT DOCUMENTS

| | | | |
|---|---|---|---|
| 3,673,601 | 6/1972 | Hertz | 346/75 |
| 4,928,113 | 5/1990 | Howell et al. | 346/75 |
| 4,942,409 | 7/1990 | Paton et al. | 346/75 X |

*Primary Examiner*—Benjamin R. Fuller
*Assistant Examiner*—Gerald E. Preston
*Attorney, Agent, or Firm*—Beehler & Pavitt

[57] ABSTRACT

Described is a nozzle configuration for an ink-jet printer in which the unshielded intervals between the drop-formation nozzle, the charging electrode and the deflection plates are chosen to be maximally 0.1–2 mm while further in the passage of the charging electrode a discharge aperture is present which connects to a channel for removing ink or other medium by suction.

Also is described a process for operating said nozzle configuration in which during starting and/or stopping thereof medium is transported through the channels connecting to the charging electrode.

The medium may be air and/or a protective fluid.

32 Claims, 3 Drawing Sheets

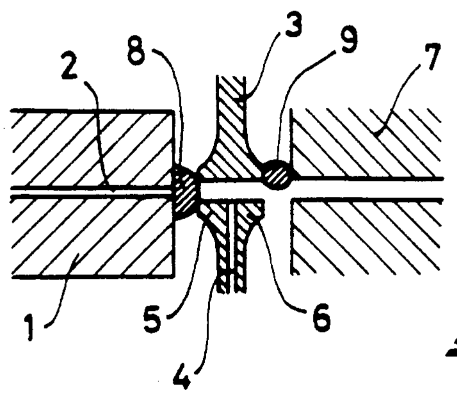
FIG. 1a.
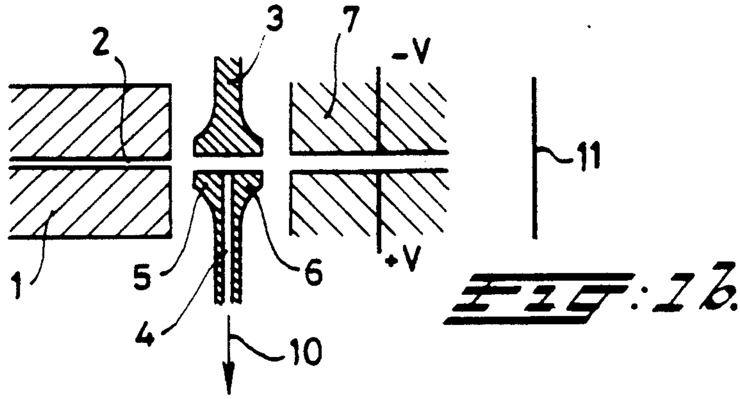
FIG. 1b.
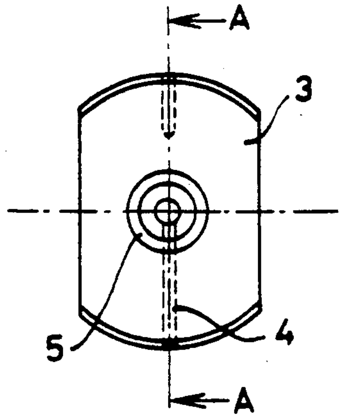
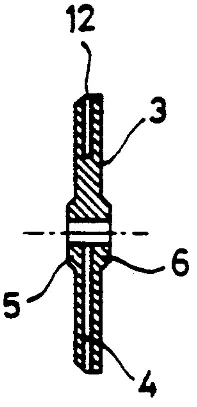
FIG. 2a. FIG. 2b.

NOZZLE CONFIGURATION FOR AN INK-JET PRINTER AND PROCESS FOR OPERATING SUCH A NOZZLE CONFIGURATION

BACKGROUND OF THE INVENTION

The present invention relates to a nozzle configuration for forming, charging and deflecting ink drops in an ink-jet printer, comprising a drop-formation nozzle, a charging electrode provided with a passage, and deflection plates, the central axes of said parts lying in line with one another.

Such a nozzle configuration is used in an ink-jet printer in order to charge drops which are formed under pressure, starting from a drop formation nozzle, while passing through the passage of a charging electrode, and subsequently to deflect them, through selective excitation of a set of deflection plates, depending on the final destination of a particular drop or series of drops. The nozzle configurations can also be designed in such a way that the drops are charged selectively through selective excitation of the charging electrode; the deflection plates are then connected to a constant deflection voltage.

Such a known nozzle configuration shows problems in use which are largely due to blockages connected with pollution. Dried-up ink and dust collecting in the nozzle configuration can cause such problems, so that fault-free working of the nozzle configuration is not achieved.

Attempts have been made through a suitable ink formulation to prevent blockages caused by solid material elements from the ink. In that case blockages can still occur through dust particles from the environment caking on the nozzle, the charging electrode and the deflection plates. The risk of pollution as a result of ink drops settling on the nozzle configuration occurs mainly during starting up and ending of operation of the ink-jet printer.

Attempts have been made to provide solutions of a constructive nature to the problems described above. For example, an attempt was made to build into the pressure circuit of the drop-formation nozzle a quick-acting valve which opens only at relatively high pressure. The pressure in the nozzle is then built up in a relatively short time, which means that the time during which fluid comes out of the nozzle at low speed is reduced. The high-pressure pulse required for opening the quick-acting valve does, however, mean that there is a risk of damage to the nozzle and the valve itself, which is undesirable. The valve is also expensive, which adversely affects the price of the printer. In order to prevent pollution of the nozzle configuration, the passage in the charging electrode, which can be in the form of a bore or a slit, is often made much larger than is actually necessary to allow the jet through.

Such a large dimension of the passage in the charging electrode is, however, a disadvantage because in that case extraneous electric fields can affect the charge, resulting in an undesirable deviation in the charging of the drops. In order to counter this effect, the length of the charging electrode, measured in the direction of the path of the drops, must increase. Through such measures, there is, however, an increased risk of charged and uncharged drops merging, which can have an effect on the final sharpness of the image to be printed.

In view of the last-mentioned considerations, a relatively small passage in the charging electrode and a small dimension measured in the drop path direction would be precisely what is required.

Also, on account of the required overall space for arranging several nozzle configurations, it is very important to keep the dimensions of the various parts of the nozzle configuration as small as possible, and to minimize the intervals between them.

In that case the chance of pollution is, however, increased again.

The object of the present invention is to provide a solution to the above-mentioned pollution problems, while at the same time providing a nozzle configuration with very small dimensions and distances between parts, which permits placing in an arrangement of great density.

SUMMARY OF THE INVENTION

The nozzle configuration of the above-mentioned type is to this end according to the invention characterized in that the geometry and the placing of the drop-formation nozzle, the charging electrode and the deflection plates is selected in such a way that at least the unshielded interval directly adjacent to the path of the drops is a maximum of 0.1–2 mm and in the wall of the passage of the charging electrode there is a discharge aperture which connects to a channel which can be connected to extraction means.

Through selecting the shape and the interval between the drop-formation nozzle, the charging electrode and the deflection plates in such a way that very small intervals are produced, the risk of pollution through penetrating ink and caking of dust is essentially increased. The intervals can be so small that there is even some capillary action. However, providing a discharge channel of small size in the wall of the passage in the charging electrode makes it possible at the start and finish of the operation of the nozzle configuration, as it were, to flush the configuration at low pressure while continuously discharging the ink fed out of the nozzle, which means that any caked ink residues and pollution are dissolved and discharged. During such a flushing operation, it is not necessary to excite the charging electrode and the deflection plates. After a sufficiently long flushing time, the extraction is then ended and, through simultaneous excitation of the various parts of the nozzle configuration, the operation of the ink-jet printer can begin.

The various parts of the nozzle configuration need not be a short distance from the other parts over their entire surface; in particular, in the case of the nozzle configuration according to the invention, the drop-formation nozzle and/or the charging electrode and/or the deflection plates in the region adjacent to the aperture for permitting the passage of the drops is provided with a bulge whose wall adjacent to the aperture extends parallel to the central axis of the part in question.

If such a bulge is present, the distance between the inside wall and the outside wall of the bulge will expediently be 0.1 to 2 mm. In the event of the passage in the charging electrode being a through bore, the bulge will therefore be of an annular type; if the passage is slit-shaped, the shape of the bulge will correspond thereto. In any case the width of the bulge will be 0.1 to 2 mm; such a dimension is not, however, critical.

The discharge aperture present in the passage of the charging electrode and the channel connecting thereto can in general have a diameter in the range 0.1 to 1.0 mm, although again such a dimension is not critical. The channel connecting to the discharge aperture will be essentially at right angles to the direction of movement of the ink drops. The invention is also embodied in a nozzle configuration of the type described above according to the invention, which is incorporated, with or without a number of identical specimens, in an ink-jet printer which is known per se.

The compact layout of the nozzle configuration according to the invention is an advantage in particular if several nozzles are included in an arrangement; due to the greatly reduced risk of pollution, the overall size of an arrangement can be kept very small.

In order to obtain a better protection against drying-up of ink, an additional feed channel is advantageously present in the charging electrode for feeding in a medium which prevents ink from drying up. It has, in fact, been found that there are certain fluids with a very low vapour tension and with a good solvent action on the constituents of the ink which, when they are placed in the space between the drop-formation nozzle and the charging electrode and in the passage of the charging electrode, prevent drying-up of ink and dissolve any ink constituents left behind.

In particular, when the operation of a nozzle configuration is stopped, the last action can be to feed through such a channel a small quantity of such a medium, which accumulates in the apertures between the various parts of the nozzle configuration and prevents drying-up there.

When the nozzle configuration is started up again, ink can then be fed in, while at the same time the extraction through the channel takes place, so that the mixture of medium which prevents ink from drying up and ink itself is discharged directly through the channel in the charging electrode.

The additional feed channel can be provided in various ways: it can, for example, open out in the wall of the passage of the charging electrode, but it can also open out in the face of the charging electrode which faces the drop-formation nozzle, and in particular above the passage, so that medium fed in will go into the passage in all cases.

The invention also relates to a process for operating a nozzle configuration of an ink-jet printer in which ink drops are released through the nozzle under pressure, these drops are selectively electrically charged, and the charged drops are deflected, characterized in that a nozzle configuration of the type described above according to the invention is used and on starting-up and/or stopping of the operation thereof medium conveyance takes place in the channels connecting to the charging electrode.

In particular, with the use of the process according to the invention, at the starting and stopping of the nozzle configuration, air is extracted through the channel opening out in the passage of the charging electrode.

Through this extraction, imperfectly formed drops are removed at the beginning or end of the operation.

Through the same channel as that through which the extraction takes place, it is also possible to feed in a protective fluid when the operation of the nozzle configuration stops, and following the first extraction operation carried out for removal of imperfectly formed drops.

The protective fluid can also be fed in through an additional feed channel which opens out either in the wall of the passage in the charging electrode or above the passage thereof in the wall of the charging electrode which faces the drop-formation nozzle.

The fluid used as the protective fluid will preferably have a low vapour tension and good solvent action on the constituents of the ink. Suitable fluids in that connection are polyalkylene glycols, alkylene glycols, lower alkyl ethers of alcohols, N-methyl-2-pyrrolidone, 1,3-dimethyl-2-imidazolidinone and mixtures of one or more of those fluids.

BRIEF DESCRIPTION OF THE DRAWINGS

The invention will now be explained with reference to the drawing, in which:

FIGS. 1*a* and 1*b* show a nozzle configuration according to the invention in a polluted state and during the cleaning operation;

FIGS. 2*a* and 2*b* show a charging electrode in a preferred embodiment;

In FIG. 1*a* a nozzle is shown shematically by 1, with an ink feed channel 2. The ink is fed in under relatively high pressure to the channel 2 and in the process shows a tendency to form drops. During operation of the nozzle configuration the drops formed are charged in the passage of the charging electrode 3, and the charged drops are then selectively deflected according to a predetermined programmed between the deflection plates 7, while the uncharged drops pass the deflection plates undeflected and arrive on the substrate. Reference numbers 8 and 9 indicate pollution which has accumulated in the narrow apertures, and which can be made up of dried-up ink, dust or other polluting material. In this case, the charging electrode is provided with bulges 5 and 6 on both sides, while a discharge channel 4 is present in the charging electrode. On starting-up of the configuration, ink is fed in through the nozzle 2, while the charging electrode 3 and the deflection plates 7 are not excited. Air is extracted, by means not shown, through the channel 4 which opens out in the discharge aperture in the charging electrode 3, for removal of the ink fed in under low pressure. The quantity of air passed through is not critical; a quantity between 0.5 and 16 litres per minute is suitable. On completion of the cleaning operation, the airstream 10 is stopped, and the charging electrode 3 and the defection plates 7 are excited, and the substrate 11 to be printed is set in motion for the formation of a pattern which arises through selective excitation of the charging electrode and/or the deflection plates 7.

FIG. 2 shows the charging electrode 3 in greater detail, in FIG. 2*a* the discharge channel 4 being indicated by dotted lines, while the bulge 5 is also indicated. FIG. 2*b* is a cross-section along the line A—A of FIG. 2*a*. In a specific embodiment the greatest dimension of the charging electrode 3 is, for example, 12 mm, while the greatest width is 8 mm. The circular bore has a dimension of 1 mm, while the bulge 5 has a diameter of approximately 2.4 mm. The channel 4 has a cross-section of 0.5 mm, while a fixing aperture 12 is also present, also with a cross-section of 0.5 mm. The bulge 5 has a bevel with an angle of 45°, while all sharp edges of the charging electrode are also broken.

The charging electrode has a surface roughness of approximately 1.6 ru.

Various variants of the nozzle configuration according to the invention are shown in FIGS. *3a* to *3d*.

In FIG. *3a* the nozzle itself is provided with a bulge 1', while the charging electrode is also provided with a bulge 6 at one side.

In FIG. *3b* the nozzle and the deflection plates are provided with bulges 1' and 7' respectively.

In FIG. *3c* the nozzle is in the form of a capillary nozzle 1'' with a bulge which penetrates into the passage of the charging electrode 3; the deflection plates are also provided with a bulge 7'.

In FIG. *3d* a capillary outflow nozzle 1'' is also shown, in this case the charging electrode 3 being provided C with a single bulge 6'.

The embodiments shown here are, of course, not all the embodiments which are possible within the scope of the invention; other embodiments are also conceivable for the expert.

Figure 3A:
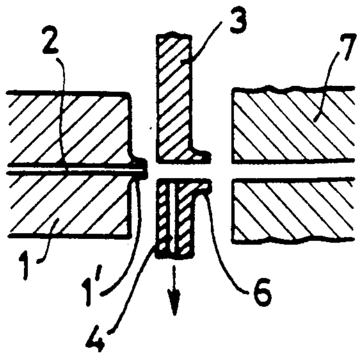
FIGS. 3*a* to *d* show a number of possible variants of a nozzle configuration according to the invention.
Figure 3B:
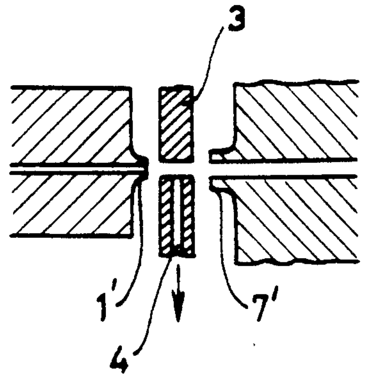
Figure 3C:
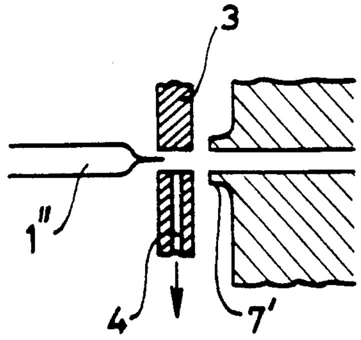
Figure 3D:
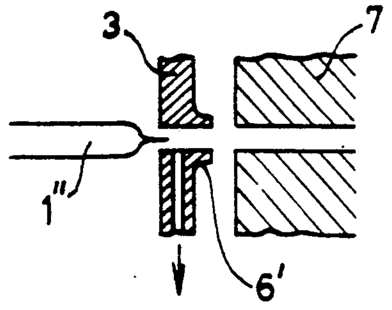
Figure 4:
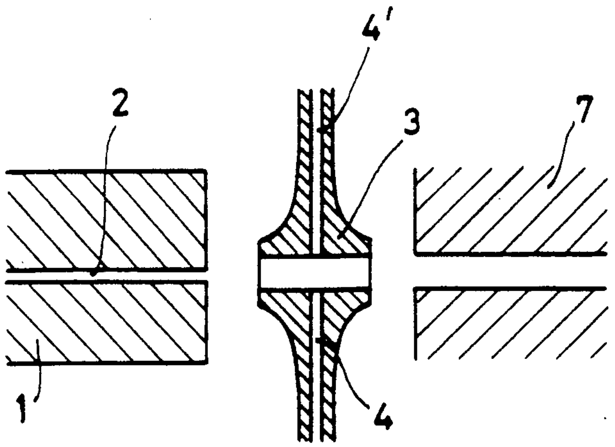
FIG. 4 shows a nozzle configuration of the type shown in FIG. 1, in which additional feed channel is present.

FIG. 4 shows a nozzle configuration of the type shown in FIG. 1: in the charging electrode there is, however, an additional feed channel 4' for feeding into the passage of the charging electrode a protective fluid with low vapour tension and a good solvent action on the constituents of the ink to be used.

Following the stoppage of the operation of the drop-formation nozzle, air is first extracted for a short time through channel 4 for removal of following and/or imperfectly formed drops. During the above-mentioned extraction, a protective fluid can already be fed through the channel 4', following which the extraction through channel 4 is ended and the infeed of protective fluid such as, for example, glycerol, N-methyl-pyrrolidone etc. is continued for some time yet until all critical narrow apertures are filled with the protective fluid. When the nozzle configuration is started up again, a quantity of protective fluid is first removed by suction, and the drop-formation nozzle is then excited for the formation and delivery of ink drops. In the first instance, a mixture of protective fluid and ink is then removed, gradually becoming richer in ink until in the end pure ink is being discharged. The extraction through channel 4 is then ended, and normal operation of the nozzle configuration can take place.

Figure 5:
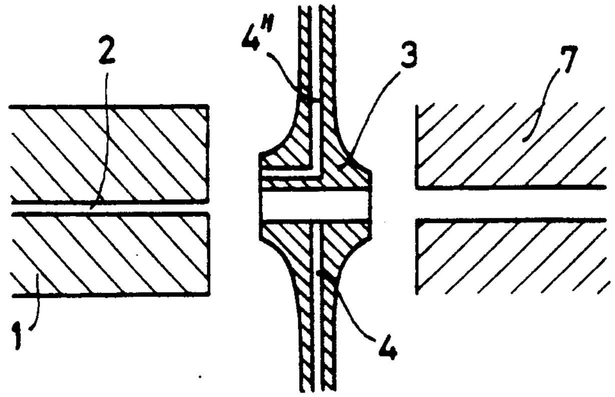
FIG. 5 shows a nozzle configuration of the type shown in FIG. 4, with a feed channel of a different shape.

FIG. 5 shows an additional feed channel for protective fluid of a different shape, indicated by 4''. In this case the additional feed channel opens out at the side of the charging electrode 3 facing the drop-formation nozzle, and in particular the opening is provided above the passage of the charging electrode 3.

What is claimed is:

1. Nozzle configuration for forming, charging and deflecting ink drops in an ink-jet printer, comprising a drop-formation nozzle, a charging electrode provided with a passage, and deflection plates, said nozzle, said electrode passage and said plates being axially aligned with one another, and characterized in that the drops traverse an unshielded interval between the drop formation nozzle, the charging electrodes and the deflection plates of a maximum of 0.1-2 mm and having a discharge aperture in a wall of said passage of the charging electrode connected to a channel which can be connected to contaminant extraction means for extracting contaminant,.

2. Nozzle configuration according to claim 1, in which selectable as a part, in which the drop-formation nozzle and/or the charging electrode and/or the deflection plates in a region adjacent to the aperture for permitting the passage of the drops is provided with a bulge having a wall adjacent to the aperture that extends parallel to a central axis of the part selected.

3. Nozzle configuration according to claim 2, in which a distance between an inside wall and an outside wall of the bulge is b 0.1 to 2 mm.

4. Nozzle configuration according to claim 1, in which the discharge aperture present in the wall of the passage of the charging electrode and the channel connecting thereto have a diameter of 0.1 to 1.0 mm.

5. Nozzle configuration according to claim 1, in which the channel connecting to the discharge aperture will be essentially at right angles to a direction of movement of the ink drops.

6. Nozzle configuration according to claim 1, which is incorporated in an ink-jet printer.

7. Nozzle configuration according to claim 1, in which an additional feed channel is present in the charging electrode for feeding in a medium which prevent ink from drying up.

8. Nozzle configuration according to claim 7, in which the feed channel opens out in the wall of the passage of the charging electrode.

9. Nozzle configuration according to claim 7, in which the feed channel opens out in a face of the charging electrode facing the drop-formation nozzle and above the passage.

10. Nozzle configuration according to claim 1, which is incorporated in an ink-jet printer with a plurality of identical specimens.

11. Process for operating a nozzle configuration of an ink-jet printer comprising the steps of:

releasing ink drops through an ink forming nozzle under pressure;

selectively electrically charging said drops in a passage defined in a charging electrode;

deflecting said charged drops between a plurality of deflecting plates, in that said passage is axially aligned with said nozzle and said deflecting plates and having fluid discharge channel means opening in said passage, and on starting-up and/or stopping of the operation thereof, contaminant removing medium conveyance takes place in said passage and said discharge channel connecting to the charging electrode.

12. Process according to claim 11, wherein said medium is air.

13. Process according to claim 11, in which on starting and stopping low pressure ink is fed in through the nozzle.

14. Process according to claim 11, in which on starting and stopping low pressure ink is fed in through the nozzle.

15. Process according to claim 11, in which on stopping, a protective fluid is fed in through the channel.

16. Process according to claim 11, in which on stopping, a protective fluid is fed in through one additional feed channel.

17. Process according to claim 15, in which the protective fluid used is a fluid with low vapour tension and a good solvent action on ink constituents.

18. Process according to claim 16, in which the protective fluid used is a fluid with low vapour tension and a good solvent action on ink constituents.

19. Process according to claim 17, in which the protective fluid is selected from polyalkylene glycols such as polyalkylene glycol (200), polyethylene glycol (300) etc.; alkylene glycols such as ethylene glycol, diethylene glycol, glycerol, propylene glycol etc., lower alkyl ethers of alcohols, such as triethylene glycol monomethylether, polyethylene glycol (350) monomethylether etc.; N-methyl-2-pyrrolidon, 1,3-dimethyl-2imidazolidinone and mixtures of one or more of these fluids.

20. Process according to claim 18, in which the protective fluid is selected from polyalkylene glycols such as polyalkylene glycol (200), polyethylene glycol (300) etc.; alkylene glycols such as ethylene glycol, diethylene glycol, glycerol, propylene glycol etc., lower alkyl ethers of alcohols, such as triethylene glycol monomethylether, polyethylene glycol (350) monomethylether etc.; N-methyl-2-pyrrolidone, 1,3-dimethyl-2imidazolidinone and mixtures of one or more of these fluids.

21. A print head for an ink-jet printer comprising:

an ink drop forming nozzle for ejecting ink drops under pressure, a plurality of deflecting plates, and a charging electrode having a passage therethrough positioned between and in axial alignment with said nozzle and said plates, said passage being separated from said nozzle and said plates respectively by an unshielded interval of 0.1–2 mm; and a discharge channel defined in said charging electrode and opening radially to said passage for connection to contaminant extraction means by extracting contaminant, such that a fluid can be drawn from said passage through said channel for removing contaminant accumulating in said channel and in spaces between said nozzle, said charging electrode and said plates.

22. The print head of claim 21 wherein said fluid is ink supplied by said nozzle at relatively low pressure.

23. The print head of claim 21 wherein said fluid is air.

24. The print head of claim 21 further comprising a fluid feed channel defined in said charging electrode for supplying a cleaning fluid to said passage.

25. The print head of claim 24 wherein said feed channel opens in an exterior face of said charging electrode facing said nozzle.

26. The print head of claim 24 wherein said feed channel opens in said passage.

27. A method for operating an ink-jet print head comprising an ink drop forming nozzle for ejecting ink drops under pressure, a plurality of deflecting plates, and a charging electrode having a passage therethrough positioned between and in axial alignment with said nozzle and said plates, said passage being separated from said nozzle and said plates respectively by an unshielded interval of 0.1–2 mm, said method comprising the steps of:

suspending ejection of ink drops from said nozzle; and flushing said passage with a contaminant removing fluid.

28. The method of claim 27 wherein said flushing step comprises application of suction through an opening into said passage.

29. The method of claim 28 wherein said fluid is atmospheric air drawn by said suction.

30. The method of claim 28 further comprising the step of supplying ink from said nozzle at relatively low pressure for providing said fluid.

31. The method of claim 28 wherein said charging electrode includes a feed channel defined therein, and further comprising the step of supplying a cleaning fluid through said feed channel.

32. The method of claim 31 wherein said feed channel opens into a space between said charging electrode and said nozzle and debris in said space is drawn into said passage and said discharge channel.

* * * * *